United States Patent
Malnati

(10) Patent No.: US 10,108,479 B2
(45) Date of Patent: Oct. 23, 2018

(54) DEVICE EXPECTED STATE MONITORING AND REMEDIATION

(71) Applicant: James R Malnati, Stillwater, MN (US)

(72) Inventor: James R Malnati, Stillwater, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 14/877,304

(22) Filed: Oct. 7, 2015

(65) Prior Publication Data

US 2017/0102953 A1 Apr. 13, 2017

(51) Int. Cl.
*G06F 11/00* (2006.01)
*G06F 11/07* (2006.01)
*G06F 11/30* (2006.01)
*G06F 3/06* (2006.01)

(52) U.S. Cl.
CPC .......... *G06F 11/0793* (2013.01); *G06F 3/06* (2013.01); *G06F 11/0727* (2013.01); *G06F 11/3034* (2013.01); *G06F 11/3055* (2013.01)

(58) Field of Classification Search
CPC .......... G06F 11/0727; G06F 11/0751; G06F 11/0769; G06F 11/0793; G06F 11/2289; G06F 11/3034; G06F 11/3051; G06F 11/3055; G06F 11/324; G06F 11/327; G06F 9/4418; G06F 3/0605; G06F 3/0634

See application file for complete search history.

(56) References Cited

U.S. PATENT DOCUMENTS

| | | | | |
|---|---|---|---|---|
| 5,579,234 A * | 11/1996 | Wiley | A61N 1/39 | 702/118 |
| 5,590,060 A * | 12/1996 | Granville | G01B 11/002 | 356/394 |
| 5,751,936 A * | 5/1998 | Larson | G06F 3/0601 | 711/114 |
| 5,890,204 A * | 3/1999 | Ofer | G06F 3/0605 | 711/100 |
| 6,058,455 A * | 5/2000 | Islam | G06F 11/1096 | 710/10 |
| 6,289,332 B2 * | 9/2001 | Menig | B60K 35/00 | 180/167 |
| 6,754,664 B1 * | 6/2004 | Bush | H04L 29/06 | |
| 7,146,293 B2 * | 12/2006 | Badovinac | G03G 15/5079 | 702/188 |
| 7,475,235 B1 * | 1/2009 | Bernardy | G06F 9/44505 | 713/1 |
| 7,487,381 B1 * | 2/2009 | Beaman | G06F 3/0605 | 709/220 |
| 7,913,105 B1 * | 3/2011 | Ganesh | G06F 11/3006 | 709/224 |
| 7,945,730 B2 * | 5/2011 | Daftardar | G06F 11/2089 | 711/114 |
| 8,775,607 B2 * | 7/2014 | Detro | H04L 41/0853 | 709/223 |

(Continued)

*Primary Examiner* — Marc Duncan

(57) ABSTRACT

A system and method for monitoring and correcting device operating states during steady-state operations may be automated. The operating states for devices operating in a steady-state environment may be monitored. Any operating device that is set to operate in an unexpected operating state may be automatically changed to its expected operating state. The operator may then be warned of any incorrect state assignment through a console message that cannot be ignored by the operator.

9 Claims, 4 Drawing Sheets

(56) References Cited

U.S. PATENT DOCUMENTS

| | | | |
|---|---|---|---|
| 9,152,534 B2* | 10/2015 | Balla | G06F 11/2247 |
| 2003/0069960 A1* | 4/2003 | Symons | H04L 41/085 |
| | | | 709/224 |
| 2003/0098887 A1* | 5/2003 | Li | G06F 3/04895 |
| | | | 715/809 |
| 2003/0237017 A1* | 12/2003 | Jibbe | G06F 11/0727 |
| | | | 714/4.2 |
| 2004/0006612 A1* | 1/2004 | Jibbe | H04L 41/0853 |
| | | | 709/223 |
| 2004/0228290 A1* | 11/2004 | Graves | H04L 41/12 |
| | | | 370/257 |
| 2004/0250156 A1* | 12/2004 | Weichselbaum | G06F 11/0793 |
| | | | 714/2 |
| 2013/0132553 A1* | 5/2013 | Stratton | H04L 41/50 |
| | | | 709/223 |

* cited by examiner

DEVICE EXPECTED STATE MONITORING AND REMEDIATION

FIELD OF DISCLOSURE

The instant disclosure relates to software environments. More specifically, this disclosure relates to monitoring and correcting device operating state during steady-state production operations.

BACKGROUND

Modern computer systems require that a variety of hardware devices exist in specified states for stable operation. Often storage drives may exist in only one of several potential states at a time. For example, the potential states for physical or virtual storage drives may include: Up, Down, Reserved, or Suspended. The device states may be changed by operator console commands.

In a normal processing environment, it is possible for an incorrect change in device state to occur. For example, an operator could mistakenly change the state of a device to Up when the device is expected to remain in Reserved unless a disaster recovery event occurs. Such an incorrect state change can cause significant disruption in a software environment. With the advent of virtual tape drives, there may be hundreds of devices, each with its own expected state. Without automation, these virtual devices would be unmanageable, as operators regularly make mistakes and set important system devices to the wrong state.

SUMMARY

An automated system and method for monitoring and correcting device operating states during steady-state operations may be accomplished by detecting any unexpected operating state, and setting any unexpected operating state back to the expected state upon detection. The operator may be warned of an unexpected state assignment through a console message that cannot be ignored. These mechanisms ensure that devices will operate in the correct states during steady-state operation.

According to one embodiment of the invention, a method may include monitoring, by a processor, an operating state for each of a plurality of data storage devices. The method may also include identifying, by the processor, one or more of the plurality of data storage devices for which the operating state is different than an expected operating state for each of the plurality of data storage devices. The method may further include correcting, by the processor, the operating state for each of the one or more of the plurality of data storage devices for which the operating state is different than the expected operating state. The method may also include notifying, by the processor, an operator that the operating state is incorrect for each of the one or more of the plurality of data storage devices for which the operating state is different than the expected operating state.

According to another embodiment, a computer program product may include a non-transitory computer readable medium comprising instructions which, when executed by a processor of a computing system, cause the processor to perform the steps of monitoring an operating state for each of a plurality of data storage devices. The medium may also include instructions which, when executed cause the processor to perform the steps of identifying one or more of the plurality of data storage devices for which the operating state is different than an expected operating state for each of the plurality of data storage devices. The medium may further include instructions which, when executed by the processor, cause the processor to perform the steps of correcting the operating state for each of the one or more of the plurality of data storage devices for which the operating state is different than the expected operating state. The medium may also include instructions which, when executed by the processor, cause the processor to perform the steps of notifying an operator that the operating state is incorrect for each of the one or more of the plurality of data storage devices for which the operating state is different than the expected operating state.

According to a yet another embodiment, an apparatus may include a memory, and a processor coupled to the memory. The processor may be configured to execute the steps of monitoring an operating state for each of a plurality of data storage devices. The processor may also be configured to execute the steps of identifying one or more of the plurality of data storage devices for which the operating state is different than an expected operating state for each of the plurality of data storage devices. The processor may further be configured to execute the steps of correcting the operating state for each of the one or more of the plurality of data storage devices for which the operating state is different than the expected operating state. The processor may also be configured to execute the steps of notifying an operator that the operating state is incorrect for each of the one or more of the plurality of data storage devices for which the operating state is different than the expected operating state.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
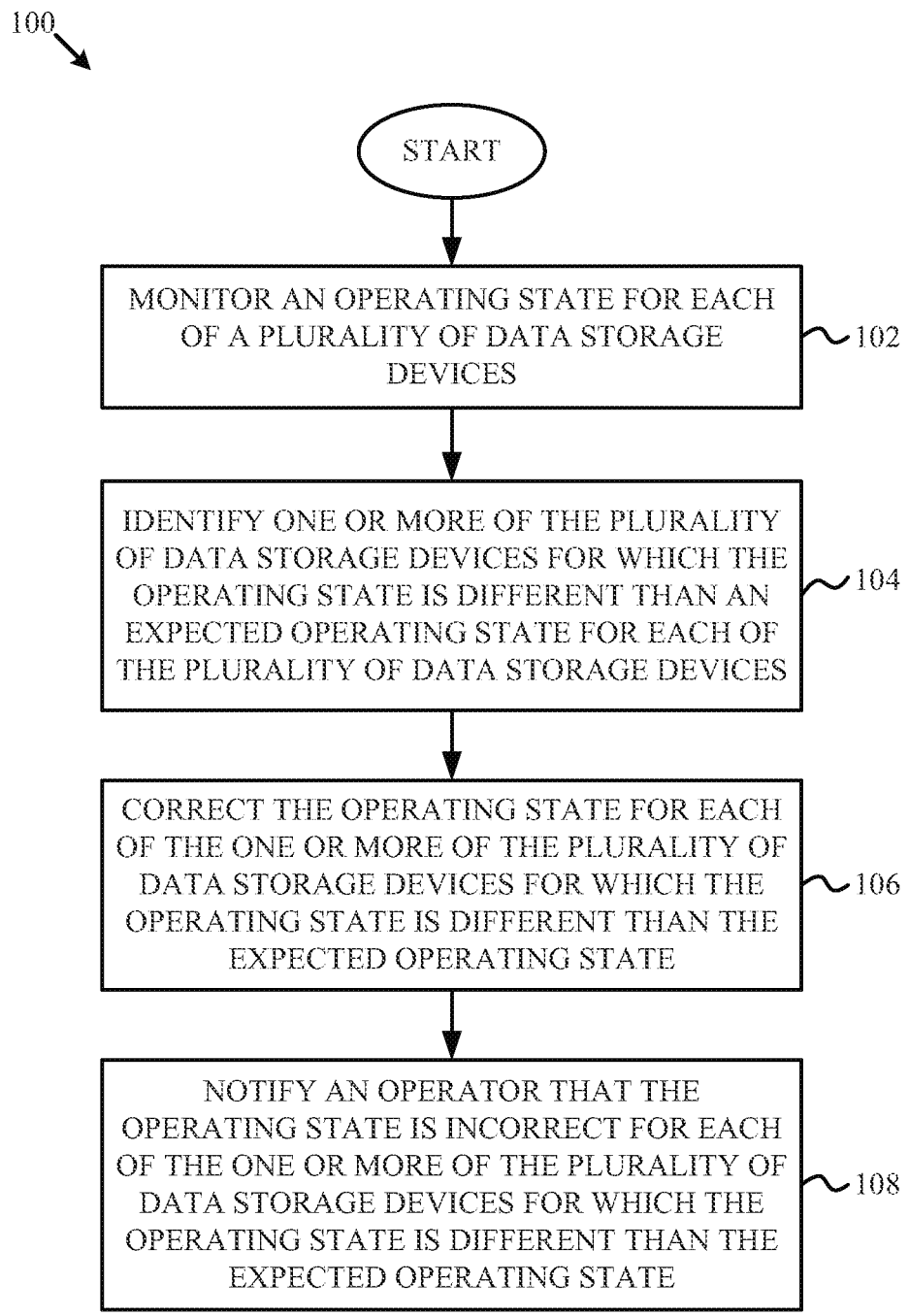
FIG. 1 is a flow chart illustrating a method for monitoring and correcting device operating states during steady-state operation, according to one embodiment of the disclosure.

FIG. 1 is a flow chart illustrating a method for monitoring and correcting device operating states during steady-state operation, according to one embodiment of the disclosure. The method 100 may start at block 102 with monitoring, by a processor, an operating state for each of a plurality of data storage devices. There may be several different operating states that each device may exist in. For example, in a Unisys Dorado system, tape drives in the system, whether physical or virtual, may exist in one of an Up, Down, Reserved, or Suspended operating state. Each device may have an expected operating state for steady-state operations.

At block 104, the method may include identifying, by the processor, one or more of the plurality of data storage devices for which the operating state is different than an expected operating state for each of the plurality of data storage devices. This difference may occur when an operator mistakenly sets an operating state for a device to an operating state different than the expected state for steady-state operations. At block 106, the method may include correcting, by the processor, the operating state for each of the one or more of the plurality of data storage devices for which the operating state is different than the expected operating state. This may occur automatically, without any operator action. The operating state may be automatically changed to the expected operating state for each of the one or more of the plurality of data storage devices for which the operating state is different than the expected operating state. At block 108, the method many include notifying, by the processor, an operator that the operating state is incorrect for each of the one or more of the plurality of data storage devices for which the operating state is different than the expected operating state. The operator may be notified with a console message that must be acknowledged by the operator. With this method 100, correct device operating states may be ensured during steady-state operation.

Figure 2:
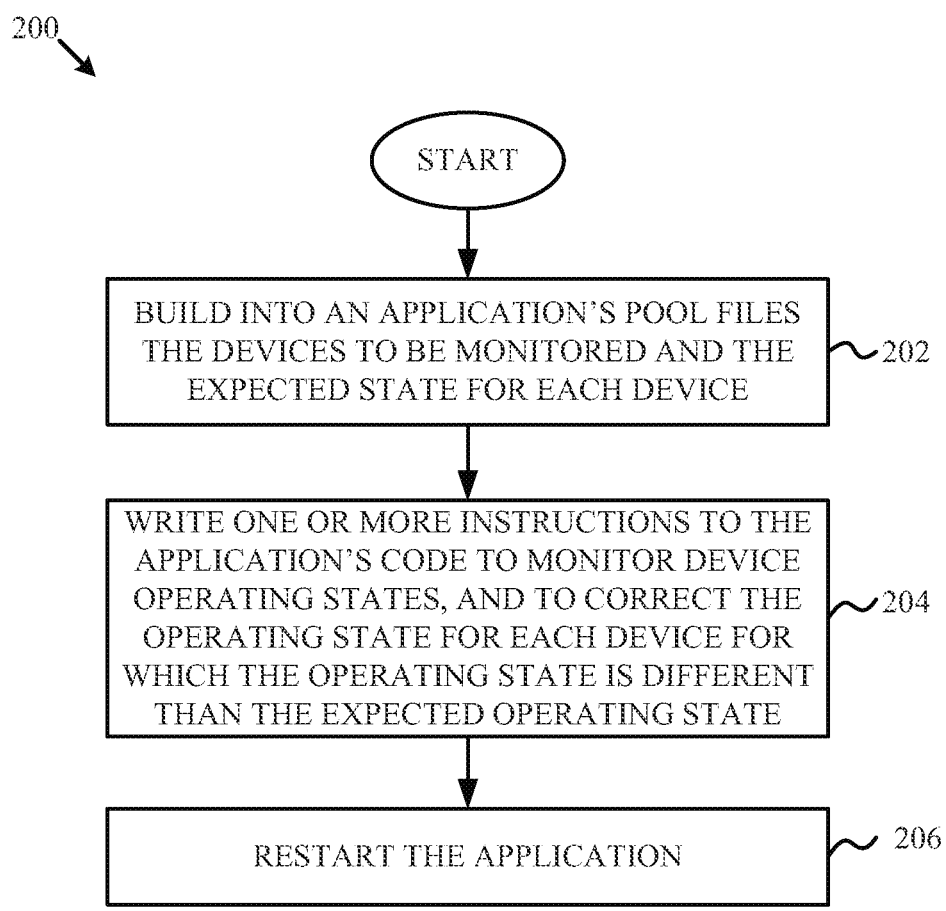
FIG. 2 is a flow chart illustrating a method for configuring an application to monitor and correct device operating states, according to one embodiment of the disclosure.

FIG. 2 is a flow chart illustrating a method for configuring an application to monitor and correct device operating states, according to one embodiment of the disclosure. The method 200 may begin at block 202 with building into an application's pool files the devices to be monitored and the expected state for each device. What devices should be included along with their expected states may be defined through consultation with a customer automation analyst. At block 204, the method may include writing one or more instructions to the application's code to monitor device operating states, and to correct the operating state for each device for which the operating state is different than the expected operating state. At block 206, the method may include restarting the application. Upon restart, the expected states are read into memory, and the expected state instructions are acted upon as configured until changed or removed.

Figure 3:
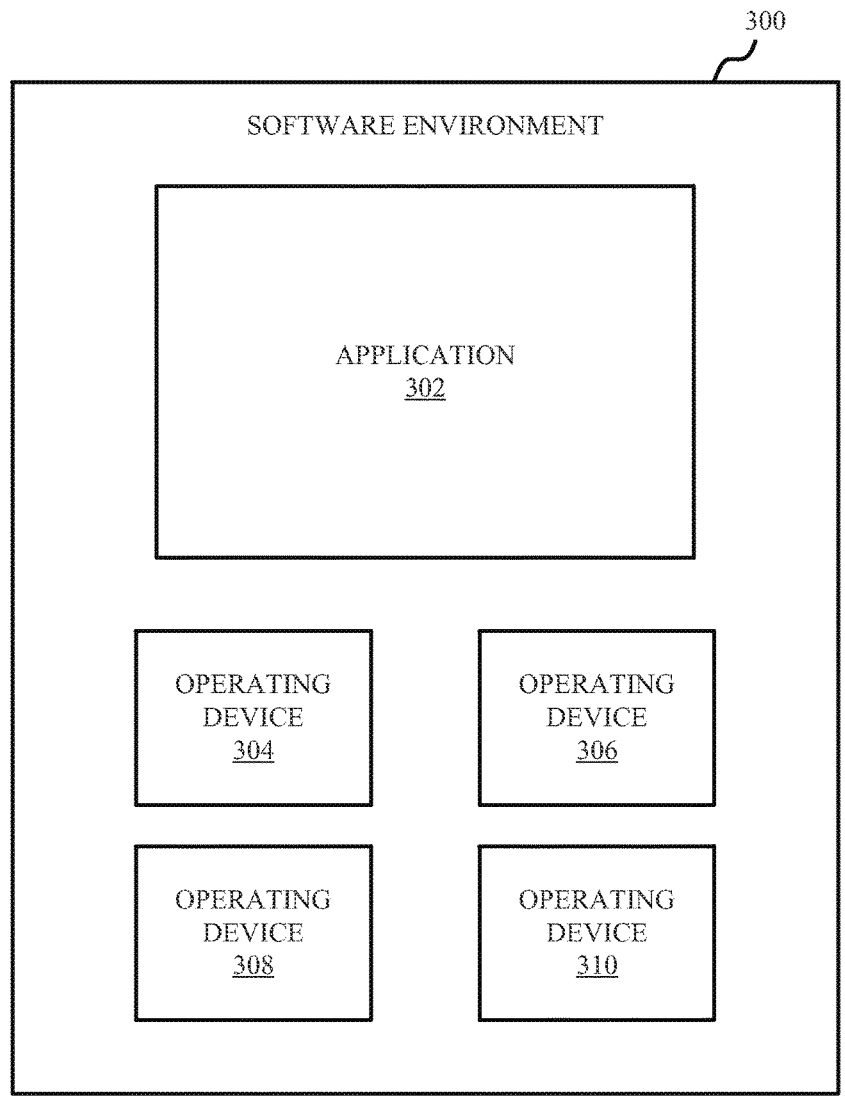
FIG. 3 illustrates a software environment during steady-state operations, according to one embodiment of the disclosure.

FIG. 3 illustrates a software environment during steady-state operations, according to one embodiment of the disclosure. For example, the methods and software described with respect to FIGS. 1-2 may be executed within the FIG. 3 software environment. The software environment 300 may include an application 302 and a plurality of operating devices 304, 306, 308, and 310. The environment 300 may be a steady-state operating environment. The application 302 may be configured to monitor and correct the operating states of the operating devices 304, 306, 308, and 310. The application may be, for example, the Unisys Shared Object Manager Application, that has been configured with an expected state attribute, allowing the SOMA application to monitor and correct the operating states for operating devices 304, 306, 308, and 310, as is done in method 100 described above with respect to FIG. 1.

Figure 4:
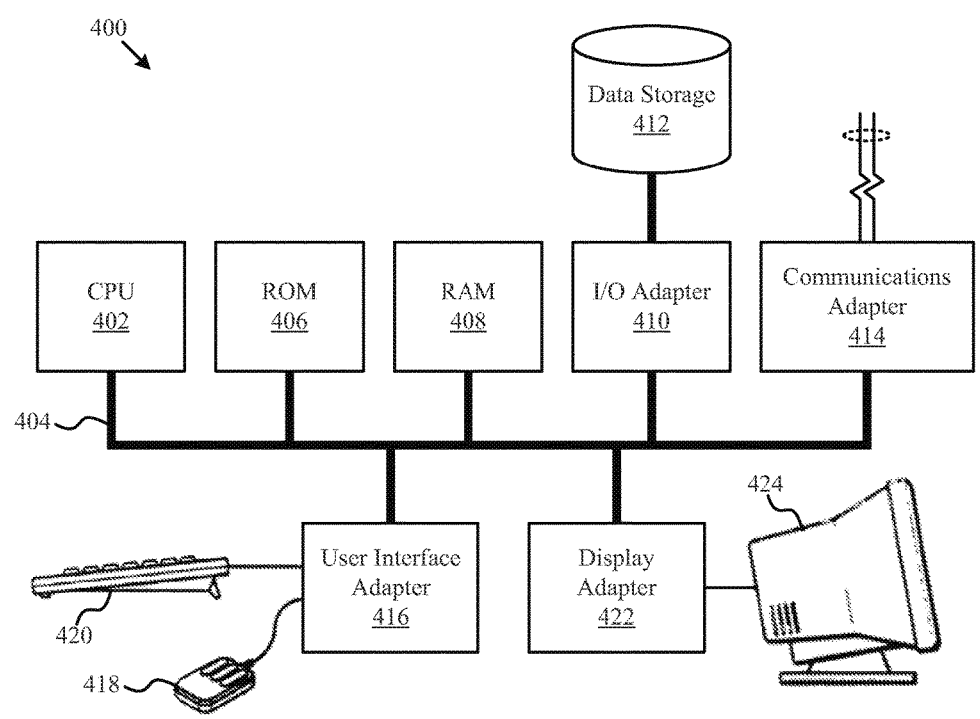
FIG. 4 illustrates a computer system adapted according to certain embodiments of a server and/or a user interface device for implementing embodiments of the disclosure, according to one embodiment of the disclosure.

FIG. 4 illustrates a computer system 400 adapted according to certain embodiments of a server and/or a user interface device for implementing embodiments of the disclosure, according to one embodiment of the disclosure. For example, computer system 400 may implement each of the embodiments illustrated in FIGS. 1-3. The central processing unit ("CPU") 402 is coupled to the system bus 404. The CPU 402 may be a general purpose CPU or microprocessor, graphics processing unit ("GPU"), and/or microcontroller. The present embodiments are not restricted by the architecture of the CPU 402 so long as the CPU 402, whether directly or indirectly, supports the operations described herein. The CPU 402 may execute the various logical instructions according to the present embodiments.

The computer system 400 may also include random access memory (RAM) 408, which may be synchronous RAM (SRAM), dynamic RAM (DRAM), synchronous dynamic RAM (SDRAM), or the like. The computer system 400 may utilize RAM 408 to store the various data structures used by a software application. The computer system 400 may also include read only memory (ROM) 406 which may be PROM, EPROM, EEPROM, optical storage, or the like. The ROM may store configuration information for booting the computer system 400. The RAM 408 and the ROM 406 hold user and system data, and both the RAM 408 and the ROM 406 may be randomly accessed.

The computer system 400 may also include an input/output (I/O) adapter 410, a communications adapter 414, a user interface adapter 416, and a display adapter 422. The I/O adapter 410 and/or the user interface adapter 416 may, in certain embodiments, enable a user to interact with the computer system 400. In a further embodiment, the display adapter 422 may display a graphical user interface (GUI) associated with a software or web-based application on a display device 424, such as a monitor or touch screen.

The I/O adapter 410 may couple one or more storage devices 412, such as one or more of a hard drive, a solid state storage device, a flash drive, a compact disc (CD) drive, a floppy disk drive, and a tape drive, to the computer system 400. According to one embodiment, the data storage 412 may be a separate server coupled to the computer system 400 through a network connection to the I/O adapter 410. The communications adapter 414 may be adapted to couple the computer system 400 to a network, which may be one or more of a LAN, WAN, and/or the Internet. The user interface adapter 416 couples user input devices, such as a keyboard 420, a pointing device 418, and/or a touch screen (not shown) to the computer system 400. The display adapter 422 may be driven by the CPU 402 to control the display on the display device 424. Any of the devices 402-422 may be physical and/or logical.

The applications of the present disclosure are not limited to the architecture of computer system 400. Rather the computer system 400 is provided as an example of one type of computing device that may be adapted to perform the functions of a server and/or the user interface device 410. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, in some embodiments, aspects of the computer system 400 may be virtualized for access by multiple users and/or applications.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
   monitoring, by a processor, an operating state for each of a plurality of data storage devices;
   identifying, by the processor, one or more of the plurality of data storage devices for which the operating state is different than an expected operating state for each of the plurality of data storage devices;
   correcting, by the processor, the operating state for each of the one or more of the plurality of data storage devices for which the operating state is different than the expected operating state; wherein the correcting comprises setting the operating state to the expected operating state for a corrected data storage device;
   receiving, by the processor, a request from an operator to change the operating state for the one or more of the plurality of data storage devices;
   notifying, by the processor, the operator that the operating state requested is incorrect for the one or more of the plurality of data storage devices for which the operating state is different than the expected operating state, wherein the notification is configured such that the operator must acknowledge the notification before the operating state is changed; and
   in which the operating state for each of the plurality of data storage devices comprises one of an Up state, a Down state, a Reserved state, or a Suspended state, wherein any of the plurality of data storage devices in the Reserved state operates only when a disaster recovery event occurs.

2. The method of claim 1, in which the processor is operating in a steady-state environment.

3. The method of claim 1, in which the step of correcting comprises changing the operating state to the expected operating state for each of the one or more of the plurality of data storage devices for which the operating state is different than the expected operating state.

4. A computer program product, comprising:
   a non-transitory computer readable medium comprising code to perform the steps of:
   monitoring, by a processor, an operating state for each of a plurality of data storage devices;
   identifying, by the processor, one or more of the plurality of data storage devices for which the operating state is different than an expected operating state for each of the plurality of data storage devices;
   correcting, by the processor, the operating state for each of the one or more of the plurality of data storage devices for which the operating state is different than the expected operating state; wherein the correcting comprises setting the operating state to the expected operating state for a corrected data storage device;
   receiving, by the processor, a request from an operator to change the operating state for the one or more of the plurality of data storage devices;
   notifying, by the processor, the operator that the operating state requested is incorrect for the one or more of the plurality of data storage devices for which the operating state is different than the expected operating state, wherein the notification is configured such that the operator must acknowledge the notification before the operating state is changed; and
   in which the operating state for each of the plurality of data storage devices comprises one of an Up state, a Down state, a Reserved state, or a Suspended state, wherein any of the plurality of data storage devices in the reserved state operates only when a disaster recovery event occurs.

5. The computer program product of claim 4, in which the processor is operating in a steady-state environment.

6. The computer program product of claim 4, in which the step of correcting comprises changing the operating state to the expected operating state for each of the one or more of the plurality of data storage devices for which the operating state is different than the expected operating state.

7. An apparatus, comprising:
   a memory; and
   a processor coupled to the memory, the processor configured to execute the steps of:
   monitoring an operating state for each of a plurality of data storage devices;
   identifying one or more of the plurality of data storage devices for which the operating state is different than an expected operating state for each of the plurality of data storage devices;
   correcting the operating state for each of the one or more of the plurality of data storage devices for which the operating state is different than the expected operating state; wherein the correcting comprises setting the operating state to the expected operating state for a corrected data storage device;
   receiving a request from an operator to change the operating state for the one or more of the plurality of data storage devices;
   notifying the operator that the operating state requested is incorrect for each of the one or more of the plurality of data storage devices for which the operating state is different than the expected operating state, wherein the notification is configured such that the operator must acknowledge the notification before the operating state is changed; and in which the operating state for each of the plurality of data storage devices comprises one of an Up state, a Down state, a Reserved state, or a Suspended state, wherein any of the plurality of data storage devices in the reserved state operates only when a disaster recovery event occurs.

8. The apparatus of claim 7, in which the processor is operating in a steady-state environment.

9. The apparatus of claim 7, in which the step of correcting comprises changing the operating state to the expected operating state for each of the one or more of the plurality of data storage devices for which the operating state is different than the expected operating state.

* * * * *